United States Patent
Pulvermacher

(10) Patent No.: US 12,222,247 B2
(45) Date of Patent: Feb. 11, 2025

(54) TEMPERATURE PROBE WITH FOOD-EMBEDDED CHARGING CONTACTS

(71) Applicant: Matrix Product Development, Inc., Madison, WI (US)

(72) Inventor: Ronald J. Pulvermacher, Cottage Grove, WI (US)

(73) Assignee: Matrix Product Development, Inc., Madison, WI (US)

( * ) Notice: Subject to any disclaimer, the term of this patent is extended or adjusted under 35 U.S.C. 154(b) by 141 days.

(21) Appl. No.: 18/115,546

(22) Filed: Feb. 28, 2023

(65) Prior Publication Data
US 2023/0288264 A1    Sep. 14, 2023

Related U.S. Application Data

(60) Provisional application No. 63/318,034, filed on Mar. 9, 2022.

(51) Int. Cl.
| | | |
|---|---|---|
| G01K 1/024 | (2021.01) | |
| G01K 1/00 | (2006.01) | |
| H02J 7/00 | (2006.01) | |

(52) U.S. Cl.
CPC .............. G01K 1/00 (2013.01); H02J 7/0042 (2013.01); *G01K 2207/02* (2013.01); *G01K 2215/00* (2013.01)

(58) Field of Classification Search
CPC .. G01K 1/00; G01K 2207/02; G01K 2215/00; H02J 7/0042; A47J 2202/00; A47J 36/32
See application file for complete search history.

(56) References Cited

U.S. PATENT DOCUMENTS

| | | | |
|---|---|---|---|
| 3,303,701 A | | 2/1967 | Matsuura |
| 3,747,603 A | * | 7/1973 | Adler ................... A61M 29/00 606/191 |
| 4,145,648 A | * | 3/1979 | Zender ................. H02J 7/0034 320/105 |
| 8,463,332 B2 | | 6/2013 | Sato et al. |
| 8,890,489 B2 | | 11/2014 | Wood |
| 9,719,862 B2 | | 8/2017 | Meyerson |

(Continued)

FOREIGN PATENT DOCUMENTS

| | | | | |
|---|---|---|---|---|
| AU | 2021379142 A9 | * | 9/2024 | ............. G01K 1/024 |
| CN | 103857555 A | | 6/2014 | |

(Continued)

OTHER PUBLICATIONS

18115546_2024-09-25_AU_2021379142_A9_H.pdf,Sep. 5, 2024.*

(Continued)

*Primary Examiner* — Gail Kaplan Verbitsky
(74) *Attorney, Agent, or Firm* — Jansson Munger & Mckinley Ltd.

(57) ABSTRACT

A wireless rechargeable temperature probe for food, the probe having an elongate body, a proximal end portion and a distal end portion, the distal end portion having a temperature sensor therein and including a probe tip and a food-embedded portion, wherein the distal end portion includes two electrical-charging contacts electrically-isolated from one another, the electrical-charging contacts both being embedded within the food during use in order to prevent difficult cleaning.

15 Claims, 2 Drawing Sheets

(56) References Cited

U.S. PATENT DOCUMENTS

| | | | |
|---|---|---|---|
| 10,024,736 | B2 | 7/2018 | Nivala et al. |
| 10,883,883 | B2 | 1/2021 | Chiu |
| 12,031,869 | B1* | 7/2024 | Lyu .................... G01K 1/08 |
| 2006/0016806 | A1 | 1/2006 | Cristiani |
| 2009/0105605 | A1 | 4/2009 | Abreu |
| 2010/0327766 | A1 | 12/2010 | Recker |
| 2011/0230931 | A1* | 9/2011 | Hagege ............. A61N 1/0524 |
| | | | 607/41 |
| 2014/0269832 | A1* | 9/2014 | Thrush ............... G01K 13/20 |
| | | | 374/170 |
| 2018/0368617 | A1 | 12/2018 | Allmendinger |
| 2019/0049314 | A1 | 2/2019 | Chu |
| 2019/0267812 | A1 | 8/2019 | Bonilla |
| 2019/0339133 | A1* | 11/2019 | Pulvermacher ........ G01K 1/022 |
| 2019/0391227 | A1 | 12/2019 | Zhang |
| 2020/0086393 | A1 | 3/2020 | Mastrad |
| 2021/0172805 | A1* | 6/2021 | Cadima .................... F16B 2/10 |
| 2021/0231503 | A1* | 7/2021 | Wu ....................... G01K 1/024 |
| 2021/0286163 | A1* | 9/2021 | Churovich ......... G02B 23/2423 |
| 2022/0049992 | A1* | 2/2022 | Nivala ................. G01K 1/024 |
| 2022/0381624 | A1 | 12/2022 | Young et al. |
| 2023/0194362 | A1* | 6/2023 | Stein ....................... G01K 1/14 |
| | | | 374/141 |
| 2024/0183720 | A1* | 6/2024 | Song ....................... G01K 7/42 |
| 2024/0310215 | A1* | 9/2024 | Wang ....................... G01K 1/12 |

FOREIGN PATENT DOCUMENTS

| | | |
|---|---|---|
| CN | 110146183 A | 8/2019 |
| CN | 209878152 U | 12/2019 |
| EP | 1577653 A1 | 9/2005 |
| JP | 2010227169 A * | 10/2010 |
| WO | 0219508 A2 | 3/2002 |
| WO | 2016171775 A1 | 10/2016 |
| WO | 2017069813 A1 | 4/2017 |
| WO | 2019009657 A1 | 1/2019 |

OTHER PUBLICATIONS

18115546_2024-09-25_JP_2010227169_A_M.pdf,Oct. 14, 2010.*
"Meater®" by Apption Labs Limited of Encino California.
Battery-free temperature sensor by Farsens of San Sebastian, Spain.
Vernier "Vernier Go Direct Charge Station"; Product Datasheet; Publication [online]. Apr. 2, 2018 [retrieved Apr. 9, 2019]. Retrieved from the Internet: <URL: https://www.vernier.com/files/manuals/gdx-crg.pdf>.

* cited by examiner

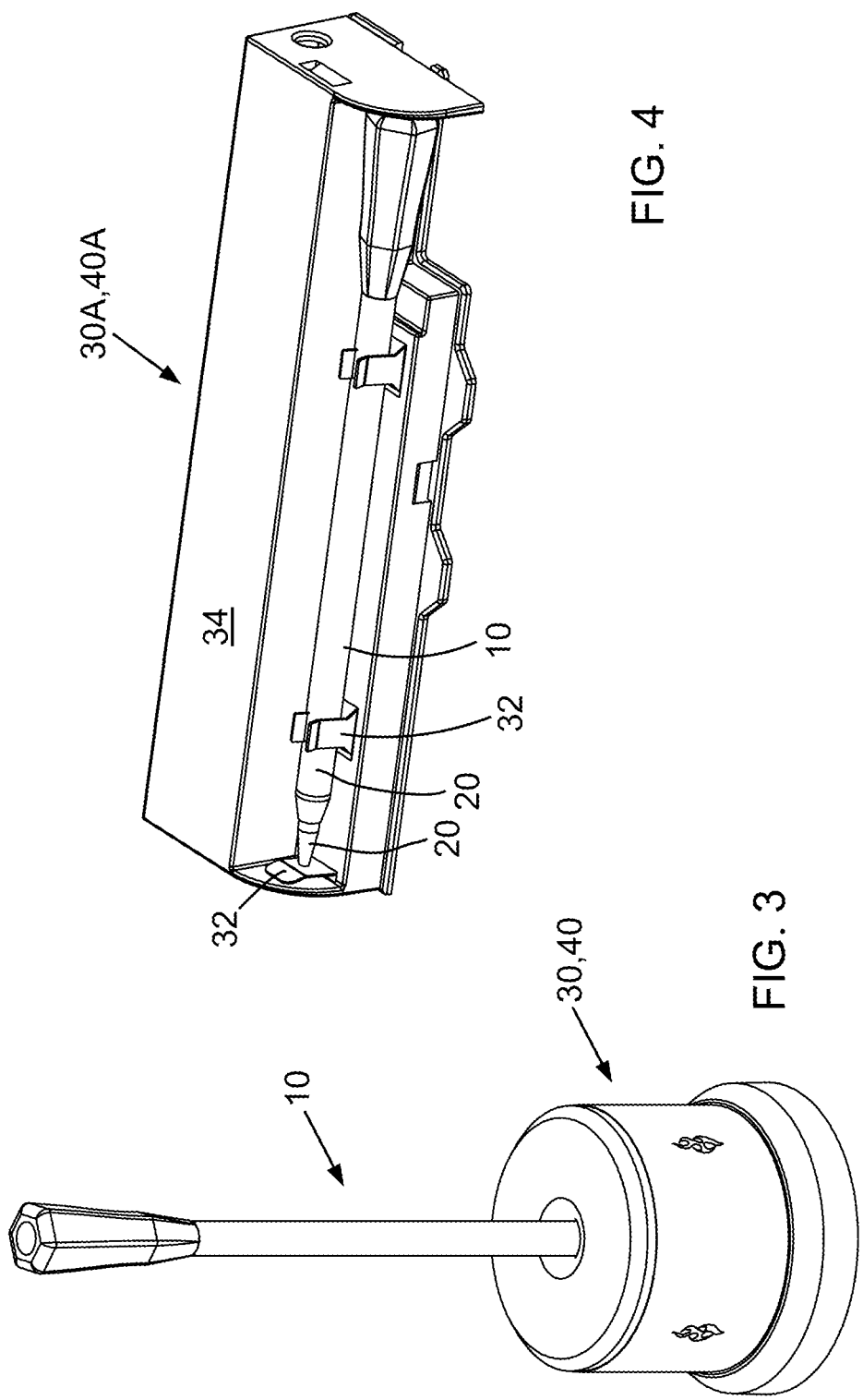

TEMPERATURE PROBE WITH FOOD-EMBEDDED CHARGING CONTACTS

CROSS-REFERENCE TO RELATED APPLICATION

This application claims the benefit of U.S. Provisional Application No. 63/318,034, filed on Mar. 9, 2022, the contents of which are incorporated by reference herein in its entirety.

FIELD OF THE INVENTION

The present invention relates to the field of food preparation and more specifically to food-temperature measurement, e.g., in connection with cooking.

BACKGROUND OF THE INVENTION

There is a need for reliable and safe temperature-measurement systems, particularly for the food industry. Among the issues which exist for such systems is a safety issue with respect to preventing food contamination from the measurement system itself. A major significant concern is the safety of the food product itself, a concern involved with whether the food reaches a temperature level assuring that the food is sufficiently cooked. The legal and financial ramifications of biologically-contaminated food products from under-cooking are enormous.

Moreover, the desirability and quality of food products often depend on proper cooking times and temperatures; e.g., overcooking can have significant and costly negative market implications, while consistency in proper cooking is very positive for marketability. Furthermore, the time-history of food temperatures during the preparation process is often important, and the present invention applies to measurements of both hot and cold (or higher and lower) temperature levels.

Rechargeable wireless temperature probes have been on the market since at least about 2017, and presently there are about seven different manufacturers that have probes utilizing two charging contacts which are located in the handle, or near the handle, of the probe. In many cooking applications, this portion of the temperature probe is exposed to high oven temperatures that bake on fats and food proteins, making cleaning of the probes prior to the next charging and use both difficult and costly. In addressing this problem, the wireless temperature probe of the present invention uses the tip and body of the probe, both of which are embedded in the food product during cooking, and so only reach temperatures as hot as the desired food rather than the often much hotter surrounding air within the cooking equipment. Such inventive probes are therefore much easier to clean after removal from the food and prior to the next charging and use.

OBJECTS OF THE INVENTION

It is a primary object of the present invention to provide a rechargeable wireless temperature probe which prevents its charging contacts from becoming coated with baked-on food matter which tends to obstruct the charging process.

Another object of this invention is to provide a rechargeable wireless temperature probe which is convenient and cost-effective to use and maintain.

These and other objects of the invention will be apparent from the following descriptions and from the drawings.

SUMMARY OF THE INVENTION

The present invention is an improved wireless rechargeable temperature probe for food. The improved temperature probe has an elongate body, a proximal end portion and a distal end portion, the distal end portion including a temperature sensor therein, and an improvement such that the distal end portion includes two electrical-charging contacts electrically-isolated from one another.

In highly-preferred embodiments, the probe tip is electrically-isolated from the food-embedded portion, the food-embedded portion includes one of the electrical-charging contacts, and the probe tip includes the other electrical charging contact. In some of these embodiments, the food-embedded portion of the elongate body is one of the contacts.

In other preferred embodiments, the food-embedded portion of the elongate body includes both of the electrical-charging contacts.

Some embodiments of the inventive wireless rechargeable temperature probe of this invention include a handle on the proximal end portion, and the handle is configured to prevent rolling of the probe when it is placed on a horizontal flat surface. In some of these embodiments, the handle includes at least one flat side.

In highly-preferred embodiments, the elongate body of the wireless rechargeable temperature probe has a circular cross-section.

Another aspect of this invention is a wireless rechargeable food-temperature probe system which includes a probe and an electrically-powered probe charger. The probe has an elongate body, a proximal end portion and a distal end portion, and the distal end portion includes a temperature sensor therein and two electrical-charging contacts which are electrically-isolated from one another. The charger is configured to mate with and charge the probe.

In some embodiments of this invention, the electrically-powered probe charger further includes a battery to charge the probe.

BRIEF DESCRIPTION OF THE DRAWINGS

FIG. 3 is an isometric view of an embodiment of an electrically-powered charger configured to charge the temperature probe of the wireless rechargeable food-temperature probe system of this invention.

FIG. 4 is an isometric view of an alternative embodiment of an electrically-powered charger configured to charge the temperature probe of the wireless rechargeable food-temperature probe system of this invention.

DETAILED DESCRIPTION OF PREFERRED EMBODIMENTS

Figure 1:
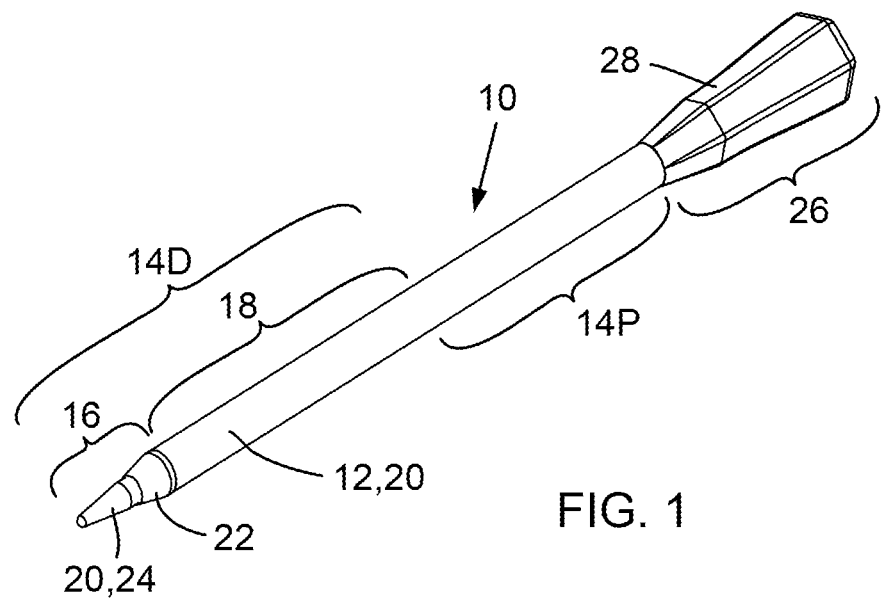
FIG. 1 is an isometric view of an embodiment of the wireless rechargeable temperature probe of this invention.

FIG. 1 illustrates a wireless rechargeable temperature probe 10 which is an embodiment of this invention used for food preparation purposes. Probe 10 has an elongate body 12 of circular-cross-section. Body 12 has a proximal end portion 14P and a distal end portion 14D, and a temperature sensor 24 is included in a probe tip 16 of distal end portion 14D. Distal end portion 14D includes two electrical-charging contacts 20 which are electrically-isolated from one another by an electrical insulator 22. Distal end portion 14D of probe 10 also includes a food-embedded portion 18 which is electrically-isolated from probe tip 16 by insulator 22. In probe embodiment 10, food-embedded portion 18 is itself one of the electrical-charging contacts 20.

Figure 2:
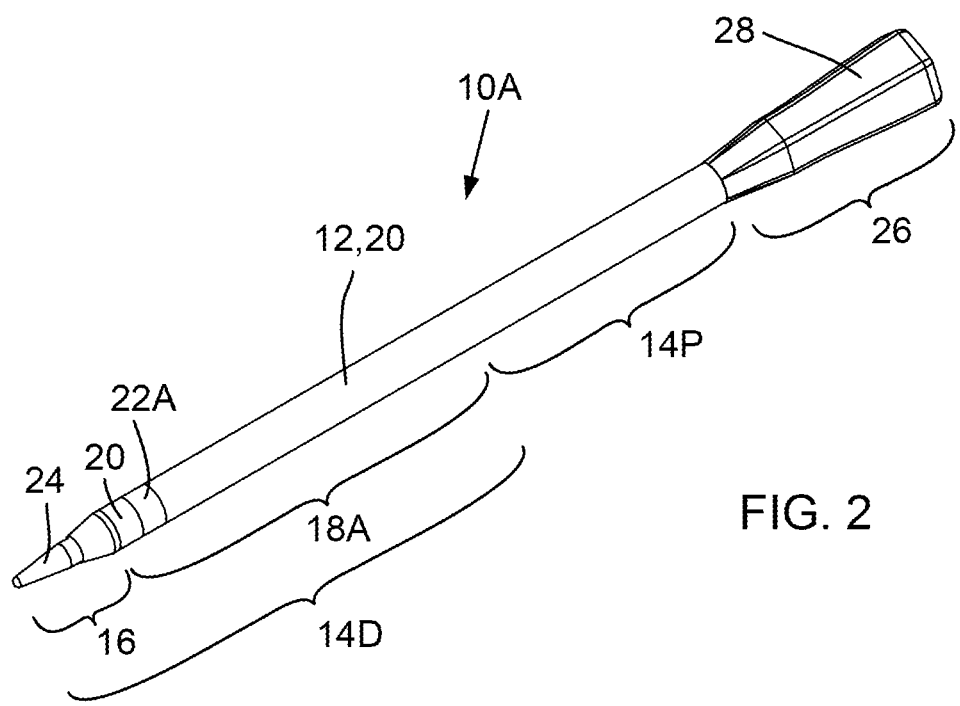
FIG. 2 is an isometric view of an alternative embodiment of the wireless rechargeable temperature probe of this invention.

FIG. 2 illustrates wireless rechargeable probe 10A which is another embodiment of this invention used for food. The structure of probe 10A is similar to that of probe 10 except that probe 10A has a food-embedded portion 18A which includes both electrical-charging contacts 20. In food-embedded portion 18A, one such contact 20 is electrically-isolated from the other of contacts 20 by an insulator 22A which is within food-embedded portion 18A.

Probes 10 and 10A of FIGS. 1 and 2, respectively, each include a handle 26 which has a hexagonal cross-section and therefore includes a set of flat sides 28 which prevent probes 10 and 10A from rolling when placed on a horizontal flat surface.

FIG. 3 illustrates an electrically-powered charger 30 in accordance with this invention, configured to charge temperature probe 10 of a wireless rechargeable food-temperature probe system 40, consisting of probe 10 and charger 30. Charger 30 is configured to match distal end portion 14D of probe 10, enabling internal contacts (not shown) in charger 30 to contact electrical-charging contacts 20 during the charging of probe 10.

Similarly, FIG. 4 illustrates an electrically-powered charger 30A in accordance with this invention, configured to charge temperature probe 10 of a wireless rechargeable food-temperature probe system 40A, consisting of probe 10 and charger 30A. Charger 30A is configured to receive and hold probe 10, enabling two charger contacts 32 of charger 30A to contact electrical-charging contacts 20 during the charging of probe 10. Charger 30A of system 40A also includes a battery compartment 34 which holds batteries and attendant circuitry which may provide the electrical charge transferred to probe 10. Alternatively, compartment 34 may also contain charger electronics configured to receive external electrical power for charging probe 10.

FIG. 4 shows charger system 40A including probe 10 with charger contacts 32 positioned to contact electrical-charging contacts 20 of probe 10. Alternatively, of course, charger 30A may be reconfigured by positioning charger contacts 32 to contact the electrical-charging contacts 20 of probe 10A.

Options for electrical and electronic configurations of circuitry within probes 10 and 10A and chargers 30 and 30A are known by those skilled in the field of electronic engineering and are not required in order to understand and appreciate the inventive wireless temperature probe disclosed herein. As an example, the electrical and electronic circuitry disclosed in US Published Application No. 2019/0339133 illustrates one approach to such circuitry that usefully applies to probes 10 and 10A and chargers 30 and 30A. The contents of such published patent application, which has been allowed but is not yet issued, are hereby incorporated by reference.

While the principles of this invention have been described in connection with specific embodiments, it should be understood clearly that these descriptions are made only by way of example and are not intended to limit the scope of the invention.

The invention claimed is:

1. In a wireless rechargeable temperature probe for food, the probe having an elongate body, a proximal end portion and a distal end portion, the distal end portion having a temperature sensor therein and including a probe tip and a food-embedded portion, the improvement wherein:
   the probe tip is electrically-isolated from the food-embedded portion;
   the food-embedded portion includes one of the electrical-charging contacts; and
   the probe tip includes the other electrical charging contact.

2. The wireless rechargeable temperature probe of claim 1 wherein the food-embedded portion of the elongate body is one of the electrical-charging contacts.

3. The wireless rechargeable temperature probe of claim 1 further including a handle on the proximal end portion, the handle being configured to prevent rolling when placed on a horizontal flat surface.

4. The wireless rechargeable temperature probe of claim 3 wherein the handle includes at least one flat side.

5. The wireless rechargeable temperature probe of claim 1 wherein the elongate body has a circular cross-section.

6. A wireless rechargeable food-temperature probe system comprising:
   a probe having an elongate body, a proximal end portion and a distal end portion, the distal end portion having a temperature sensor therein and including a probe tip and a food-embedded portion, and wherein
      the probe tip is electrically-isolated from the food-embedded portion,
      the food-embedded portion includes one of the electrical-charging contacts, and
      the probe tip includes the other electrical charging contact; and
   an electrically-powered probe charger configured to mate with and charge the probe.

7. The wireless rechargeable food-temperature probe system of claim 6 wherein the food-embedded portion of the elongate body is one of the electrical-charging contacts.

8. The wireless rechargeable food-temperature probe system of claim 6 further including a handle on the proximal end portion, the handle being configured to prevent rolling when placed on a horizontal flat surface.

9. The wireless rechargeable food-temperature probe system of claim 8 wherein the handle includes at least one flat side.

10. The wireless rechargeable food-temperature probe system of claim 6 wherein the elongate body has a circular cross-section.

11. The wireless rechargeable food-temperature probe system of claim 6 wherein the electrically-powered probe charger further includes a battery to charge the probe.

12. The wireless rechargeable food-temperature probe system of claim 11 wherein the food-embedded portion of the elongate body is one of the electrical-charging contacts.

13. The wireless rechargeable food-temperature probe system of claim 11 further including a handle on the proximal end portion, the handle being configured to prevent rolling when placed on a horizontal flat surface.

14. The wireless rechargeable food-temperature probe system of claim 13 wherein the handle includes at least one flat side.

15. The wireless rechargeable food-temperature probe system of claim 11 wherein the elongate body has a circular cross-section.

* * * * *

UNITED STATES PATENT AND TRADEMARK OFFICE
CERTIFICATE OF CORRECTION

PATENT NO. : 12,222,247 B2
APPLICATION NO. : 18/115546
DATED : February 11, 2025
INVENTOR(S) : Ronald J. Pulvermacher Page 1 of 1

It is certified that error appears in the above-identified patent and that said Letters Patent is hereby corrected as shown below:

In the Claims

Column 4, Line 6, delete "one of the" and insert --an--.
Column 4, Line 7, delete "contacts" and insert --contact--.
Column 4, Line 8, delete "the other electrical charging" and insert --another electrical-charging--.
Column 4, Line 29, delete "one of the" and insert --an--.
Column 4, Line 30, delete "contacts" and insert --contact--.
Column 4, Line 31, delete "the other electrical charging" and insert --another electrical-charging--.

Signed and Sealed this
Twentieth Day of May, 2025

Coke Morgan Stewart
*Acting Director of the United States Patent and Trademark Office*